(12) United States Patent
Kim et al.

(10) Patent No.: US 12,366,878 B2
(45) Date of Patent: Jul. 22, 2025

(54) ELECTRONIC PEDAL APPARATUS

(71) Applicants: HYUNDAI MOTOR COMPANY, Seoul (KR); KIA CORPORATION, Seoul (KR)

(72) Inventors: Eun Sik Kim, Gwangmyeong-si (KR); Hyeon Uk Kim, Daegu (KR); Kyung Nam Kim, Daegu (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/610,849

(22) Filed: Mar. 20, 2024

(65) Prior Publication Data
US 2025/0199560 A1   Jun. 19, 2025

(30) Foreign Application Priority Data
Dec. 14, 2023   (KR) .................... 10-2023-0181912

(51) Int. Cl.
*G05G 1/38*   (2008.04)
*G05G 5/05*   (2006.01)
*G01B 7/00*   (2006.01)
*G01D 5/14*   (2006.01)

(52) U.S. Cl.
CPC ............... *G05G 1/38* (2013.01); *G05G 5/05* (2013.01); *G01B 7/003* (2013.01); *G01D 5/145* (2013.01)

(58) Field of Classification Search
CPC .................................. G05G 1/38; G05G 5/05
See application file for complete search history.

(56) References Cited

U.S. PATENT DOCUMENTS

| | | | | |
|---|---|---|---|---|
| 8,726,759 B2 * | 5/2014 | Mannle | ..................... | G05G 1/44 |
| | | | | 74/513 |
| 9,323,281 B2 * | 4/2016 | Byun | ....................... | G05G 5/03 |
| 2007/0157755 A1 * | 7/2007 | Kim | ......................... | G05G 5/03 |
| | | | | 74/513 |
| 2007/0193401 A1 | 8/2007 | Campbell | | |

FOREIGN PATENT DOCUMENTS

| | | | |
|---|---|---|---|
| KR | 10-1057967 B1 | 8/2011 | |
| KR | 10-1419208 B1 | 7/2014 | |

* cited by examiner

*Primary Examiner* — Vicky A Johnson
(74) *Attorney, Agent, or Firm* — MCDONNELL BOEHNEN HULBERT & BERGHOFF LLP

(57) ABSTRACT

An electronic pedal apparatus may be operated by a driver with a small force. When the driver operates a pedal pad, the pedal pad is operated with a fine displacement, but a change in a pedal force is increased through compression of a return spring using a rotation lever and a spring guide, so that the driver is capable of easily recognizing an operation situation of a pedal. Furthermore, safety during operation of the pedal may be more enhanced by using a dual sensing structure in which first and second permanent magnets and first and second printed circuit boards (PCBs) are used.

19 Claims, 12 Drawing Sheets

ELECTRONIC PEDAL APPARATUS

CROSS REFERENCE TO RELATED APPLICATIONS

The present application claims priority to Korean Patent Application No. 10-2023-0181912, filed Dec. 14, 2023, the entire contents of which are incorporated herein for all purposes by this reference.

BACKGROUND

1. Technical Field

The present disclosure relates to an electronic pedal apparatus mounted in a vehicle and configured to generate an acceleration signal or a braking signal of the vehicle when a driver operates the vehicle.

2. Description of the Related Art

Autonomous vehicles are smart vehicles employing autonomous driving technology that enables a vehicle to be driven to a destination without a driver directly operating a steering wheel, an accelerator pedal, a brake, and so on.

When an autonomous driving situation is universally realized, the driver can select an autonomous driving mode in which the driver does not directly drive the vehicle and the vehicle drives itself to a destination.

In the autonomous driving mode, it is required that the driver is able to rest comfortably by stretching out driver's foot. Therefore, when pedals (an accelerator pedal and a brake pedal) that are positioned in a space below a driver's seat remain exposed toward the driver, the driver's rest may be interrupted, or there is a risk of an accident occurring due to misoperation of the pedals.

Therefore, there has been development of a foldable pedal apparatus in which, in a manual driving mode, pedal pads protrude and are exposed toward the driver such that operation by the driver is capable of being performed, and in the autonomous driving situation, the pedal pads are blocked from being exposed such that the operation by the driver is unable to be performed so as to secure a comfortable rest of the driver and to secure safety such as prevention of misoperation.

In a general foldable pedal apparatus, a space in which the pedal apparatus is hidden in a hidden state is required, and the general foldable pedal apparatus has a complicated operation mechanism.

In order to solve this problem, a technology of a pressure-operated pedal apparatus has been developed.

In the pressure-operated pedal apparatus, an operation displacement of a pedal is very small, an operation mechanism is simple, and no mechanical configuration related to realize a foldable function is required, so that an indoor space of an autonomous vehicle may be significantly improved.

However, in the pressure-operated pedal apparatus, since the operation displacement of the pedal is very small, it is difficult for the driver to easily recognize how much the pedal is operated, so that a technology for solving this problem is required.

The foregoing is intended merely to aid in the understanding of the background of the present disclosure, and is not intended to mean that the present disclosure falls within the purview of the related art that is already known to those skilled in the art.

SUMMARY

An objective of the present disclosure is to provide an electronic pedal apparatus mounted in a vehicle and configured to generate an acceleration signal or a braking signal of the vehicle when a driver operates the electronic pedal apparatus, the electronic pedal apparatus being configured such that the driver is capable of operating the electronic pedal apparatus with a small force, and the electronic pedal apparatus being configured such that a change in a pedal force during operation of a pedal is increased so that the driver is capable of easily recognizing an operation situation of the pedal, thereby being capable of reducing fatigue of the driver.

In addition, another objective of the present disclosure is to provide an electronic pedal apparatus having a configuration in which a pedal operation is detected by a dual sensing structure using two permanent magnets and two PCBs, thereby being capable of further enhancing safety during the pedal operation.

In order to achieve the objectives of the present disclosure, there is provided an electronic pedal apparatus including: a pedal pad coupled to a pedal housing via a hinge pin such that the pedal pad is capable of being rotated, the pedal pad being configured to be operated by a driver; a return spring disposed on the pedal housing such that the return spring extends along a longitudinal direction of the pedal pad, the return spring being configured to provide a return force to the pedal pad; and a connection unit mounted such that the pedal pad and the return spring are connected to each other, the connection unit being configured to be operated such that a rotation movement of the pedal pad is converted into a rectilinear movement and the return spring is compressed.

The connection unit may include a rotation lever mounted on the pedal housing such that the rotation lever is capable of being rotated around a lever pin, the rotation lever having an upper end in contact with the pedal pad, and a spring guide having a front side surface in contact with a lower end of the rotation lever and having a rear side surface in contact with the return spring, the spring guide being configured to be rectilinearly moved with respect to the pedal housing by a rotation force of the rotation lever and an elastic force of the return spring.

The rotation lever may be formed such that a second length of the rotation lever from a center of the lever pin to the lower end of the rotation lever in contact with the spring guide is longer than a first length of the rotation lever from the center of the lever pin to the upper end of the rotation lever in contact with the pedal pad.

A lever stopper portion configured to restrain an initial position and a return position of the rotation lever by being in contact with a front side surface of the lower end of the rotation lever may be provided on a bottom of the pedal housing.

A guide protrusion may protrude on a side surface of the spring guide, and a guide groove into which the guide protrusion is inserted may extend along a movement direction of the spring guide on a side wall of the pedal housing.

The guide protrusion and the guide groove may be formed in shapes corresponding to each other, and the guide protrusion may be formed such that a third length of the guide protrusion in front and rear directions corresponding to the movement direction of the spring guide is longer than a fourth length of the guide protrusion in up and down directions.

An insertion groove connected to a rear side end of the guide groove and opened upward to the pedal housing may be formed in the pedal housing, and the guide protrusion of the spring guide may be mounted such that the guide protrusion is inserted into the guide groove of the pedal housing through the insertion groove.

The electronic pedal apparatus may further include a housing cover coupled to the pedal housing such that the housing cover covers the return spring and the spring guide, thereby preventing the return spring and the spring guide from being separated upward.

A first protrusion that protrudes toward the housing cover may be formed on the spring guide, and a plate spring provided with a second protrusion that realizes an operation sensation by being in contact with the first protrusion may be coupled to and mounted on the housing cover.

A friction plate may be coupled to a bottom surface of the pedal pad, the upper end of the rotation lever and the friction plate may be in contact with each other such that a first friction portion is formed, and hysteresis may be realized by the first friction portion when the pedal pad is operated.

The lower end of the rotation lever and the spring guide may be in contact with each other such that a second friction portion is formed, and the hysteresis may be realized by a simultaneous action of the first friction portion and the second friction portion when the pedal pad is operated.

The electronic pedal apparatus may further include a first permanent magnet coupled to the pedal pad, and a first PCB coupled to the pedal housing such that the first PCB faces the first permanent magnet, wherein the first PCB may be configured to recognize a change in magnetic flux of the first permanent magnet and to generate a signal related to a pedal function when the pedal pad is rotated.

The electronic pedal apparatus may further include a second permanent magnet coupled to the pedal pad, and a second PCB coupled to the pedal housing such that the second PCB faces the second permanent magnet, wherein the second PCB may be configured to recognize a change in magnetic flux of the second permanent magnet and to generate a signal related to the pedal function when the pedal pad is rotated.

The first permanent magnet may be coupled to the pedal pad at a position furthest from the hinge pin, and the second permanent magnet may be coupled to the pedal pad at a position relatively closer to the hinge pin than the first permanent magnet. Furthermore, when the pedal pad is operated, the first permanent magnet may be utilized as a main sensor since the first permanent magnet has a movement displacement relatively larger than a movement displacement of the second permanent magnet, and the second permanent magnet may be utilized as a redundancy sensor since the second permanent magnet has the movement displacement relatively smaller than the movement displacement of the first permanent magnet.

The first permanent magnet may be coupled to a front side end of the pedal pad furthest from the hinge pin, and the second permanent magnet may be coupled to a side surface of the pedal pad relatively closer to the hinge pin than the first permanent magnet without being affected by the first permanent magnet.

A pad protrusion portion may be provided on a front side of the pedal pad, a first stopper portion may be provided on a front side of the pedal housing at a portion facing the pad protrusion portion, and an initial position of the pedal pad and a return position of the pedal pad by a spring force of the return spring may be regulated when the pad protrusion portion and the first stopper portion are in contact with each other.

A second stopper portion may be provided on the front side of the pedal housing below the first stopper portion, and a full stroke position of the pedal pad may be regulated when the pad protrusion portion is in contact with the second stopper portion while the pedal pad is rotated such that the pedal pad is inserted into the pedal housing.

The hinge pin may be coupled to a lower connection portion of the pedal pad, a third stopper portion that protrudes toward the lower connection portion may be provided on the pedal housing, and the full stroke position of the pedal pad may be regulated when the lower connection portion is in contact with the third stopper portion while the pedal pad is rotated such that the pedal pad is inserted into the pedal housing.

The full stroke position of the pedal pad may be regulated by a simultaneous contact between the pad protrusion portion and the second stopper portion and between the lower connection portion and the third stopper portion.

As described above, in the electronic pedal apparatus according to the present disclosure, the driver is capable of operating the pedal with a small force. Furthermore, when the driver operates the pedal pad, the pedal pad is operated with a fine displacement, but the change in the pedal force is increased through compression of the return spring using the rotation lever and the spring guide, so that the driver is capable of easily recognizing an operation situation of the pedal and there is an effect that fatigue of the driver may be reduced.

In addition, in the pedal apparatus according to the present disclosure, the pedal apparatus has a configuration in which the pedal operation is detected by a dual sensing structure using the first and second permanent magnets and the first and second PCBs, so that there is an effect that safety during operation of the pedal may be further enhanced.

In addition, in the pedal apparatus according to the present disclosure, the pedal apparatus has a configuration in which the return spring that provides the return force to the pedal pad is disposed such that the return spring extends along the front and rear directions corresponding to the longitudinal direction of the pedal pad. Therefore, the overall height of the pedal apparatus may be configured to be small while the return spring has a long length, so that there is an effect that a large indoor space may be secured.

In addition, in the pedal apparatus according to the present disclosure, when the driver operates the pedal pad, a hysteresis operation force may be significantly realized by the simultaneous action of the first friction portion and the second friction portion, so that there is an effect that fatigue of the driver's ankle may be reduced.

In addition, in the pedal apparatus according to the present disclosure, during the initial operation stage of the pedal pad by the driver, the first protrusion of the spring guide meets the second protrusion of the plate spring, so that a substantial operation sensation is capable of being realized, thereby allowing the driver to recognize an operation sensation of the pedal. Particularly, the first protrusion of the spring guide and the plate spring that is provided with the second protrusion are applied only to an accelerator pedal, so that there is an effect that a misoperation of a brake pedal may be prevented.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

Figure 1:
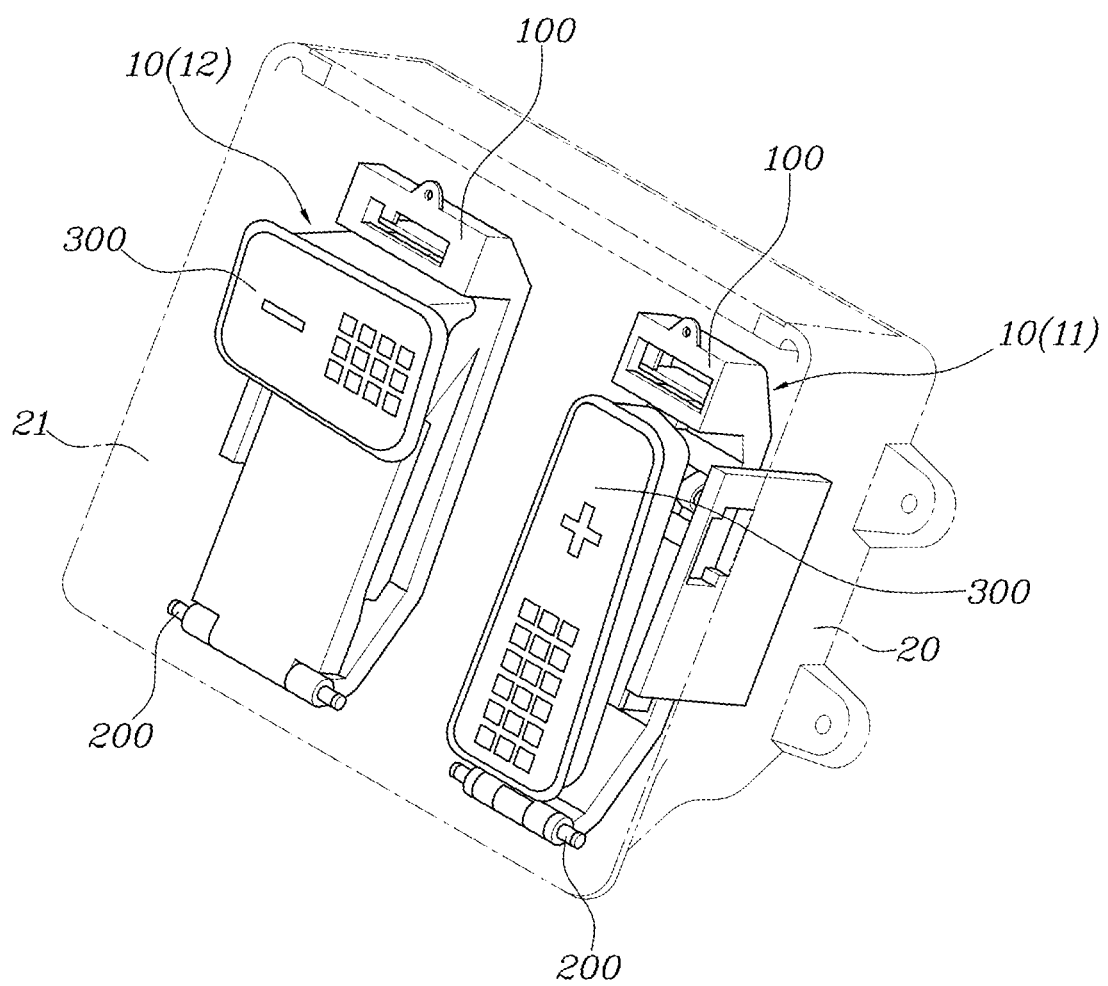
FIG. 1 is a perspective view illustrating an electronic pedal apparatus according to the present disclosure.

Hereinafter, exemplary embodiments disclosed in the present specification will be described in detail with reference to the accompanying drawings. In the present specification, the same or similar components will be denoted by the same or similar reference numerals, and a repeated description thereof will be omitted.

In the following description, the expressions "module" and "portion" contained in terms of constituent elements to be described will be selected or used together in consideration only of the convenience of writing the following specification, and the expressions "module" and "portion" do not necessarily have different meanings or roles.

Detailed description of known technologies will be omitted if it is determined that the detailed description of the known technologies obscures the embodiments of the present specification.

In addition, the accompanying drawings are merely intended to easily describe the embodiments of the present specification, but the spirit and technical scope of the present specification is not limited by the accompanying drawings. It should be understood that the present specification is not limited to specific disclosed embodiments, but includes all modifications, equivalents and substitutes included within the spirit and technical scope of the present disclosure.

Terms including ordinals such as "first" or "second" used herein may be used to describe various elements, but the elements are not limited by the terms. The terms are used only for the purpose of distinguishing one constituent element from another constituent element.

When a component is referred to as being "connected" or "contacted" to another component, it should be understood that it may be directly connected or contacted to the other component, but other components may exist therebetween.

On the other hand, when a component is referred to as being "directly connected" or "directly contacted" to another component, it should be understood that there is no other component therebetween.

Singular expressions include plural expressions unless the context clearly indicates otherwise.

It is to be understood that terms such as "including", "having", and so on are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

In addition, "unit" or "control unit" included in the names of the motor control unit (MCU) and the hybrid control unit (HCU) generally refer to a controller that controls a specific function of the vehicle and do not mean a generic function unit.

In addition, "controller" may include a communication device configured to communicate with another controller or a sensor in order to control a function assigned thereto, a memory configured to store an operating system, logic commands, and input and output information, and at least one processor configured to perform determination, calculation, and decision necessary to control the assigned function.

Hereinafter, an electronic pedal apparatus according to an exemplary embodiment of the present disclosure will be described with reference to the accompanying drawings.

Figure 2:
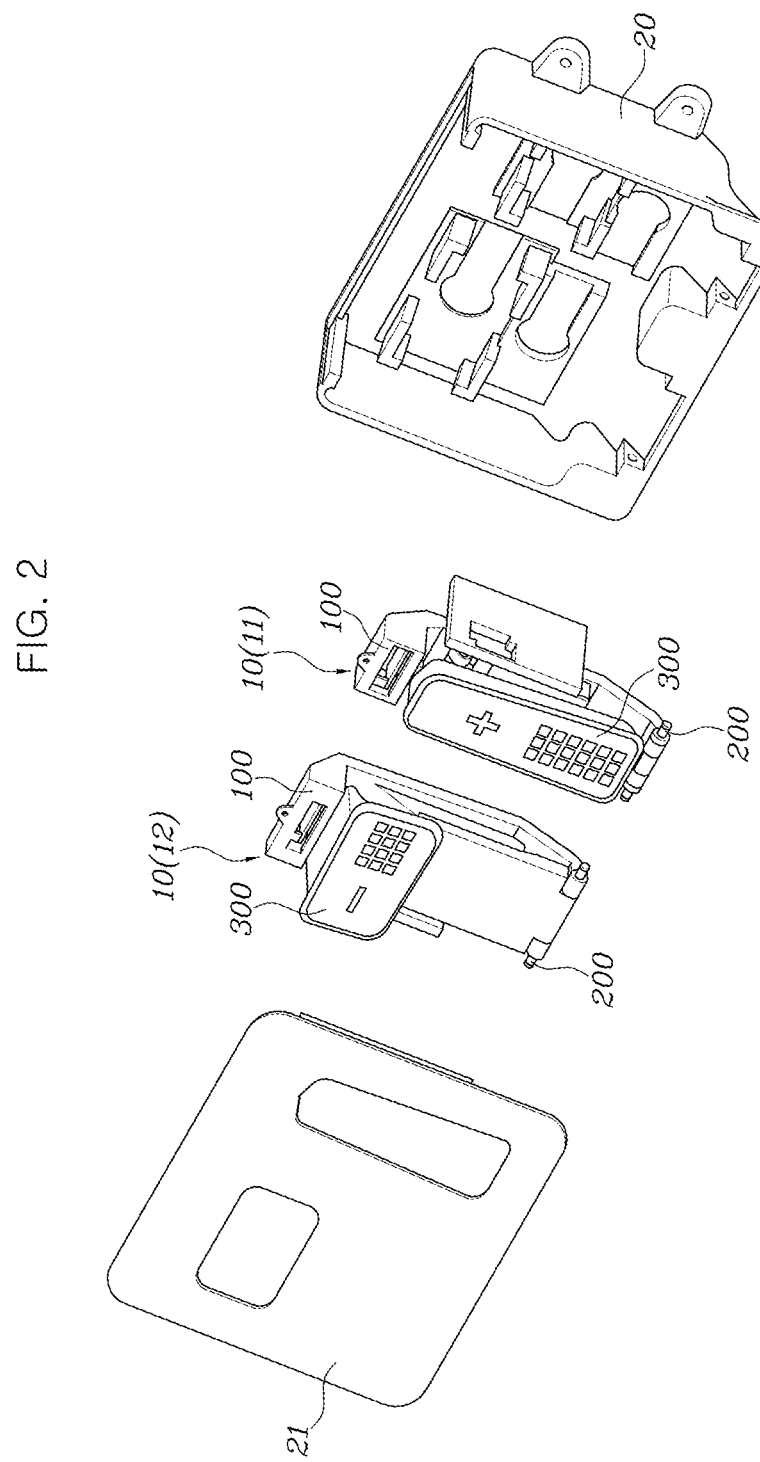
FIG. 2 is an exploded perspective view of FIG. 1.
Figure 3:
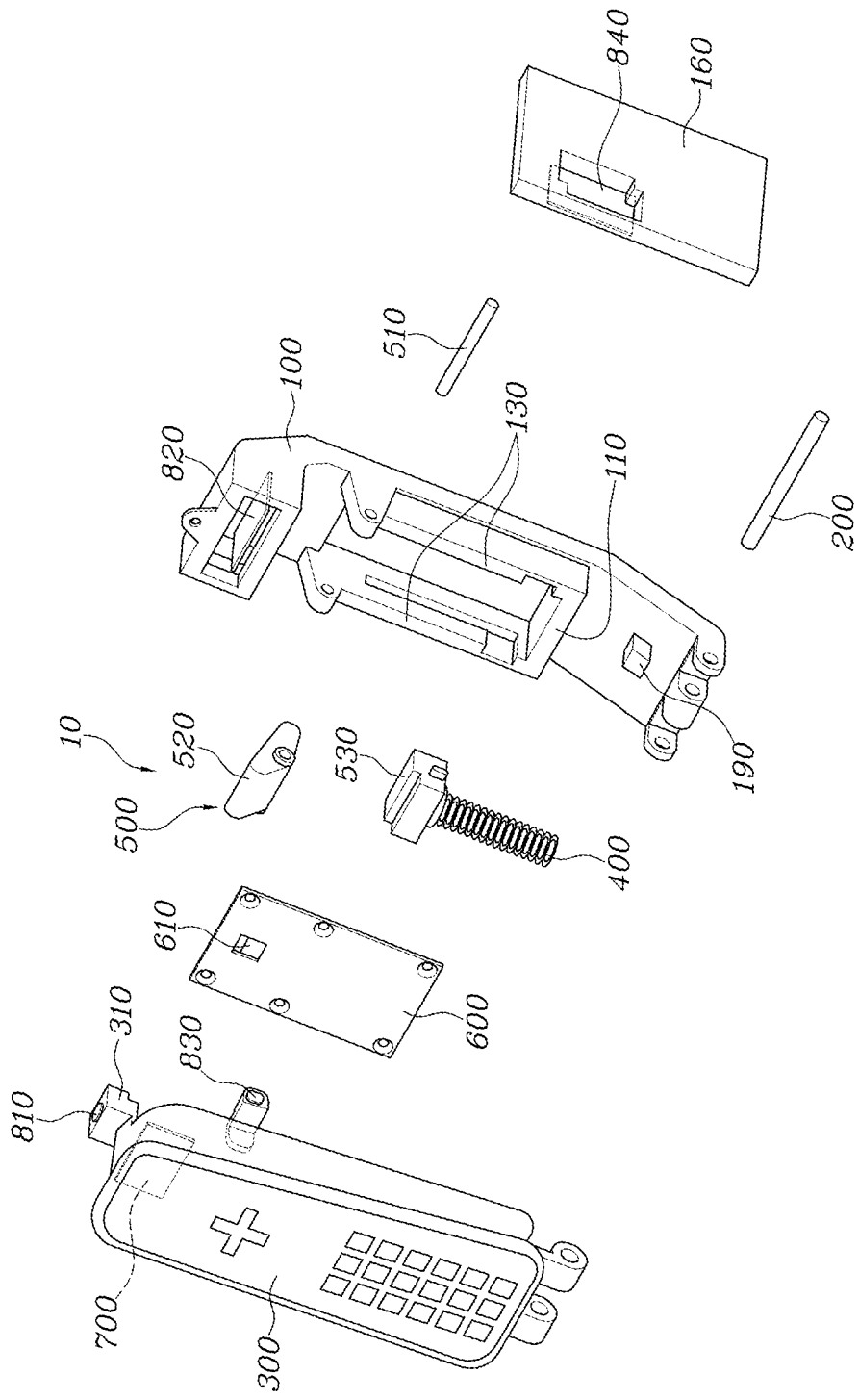
FIG. 3 is an exploded perspective view illustrating a pedal according to the present disclosure.
Figure 4:
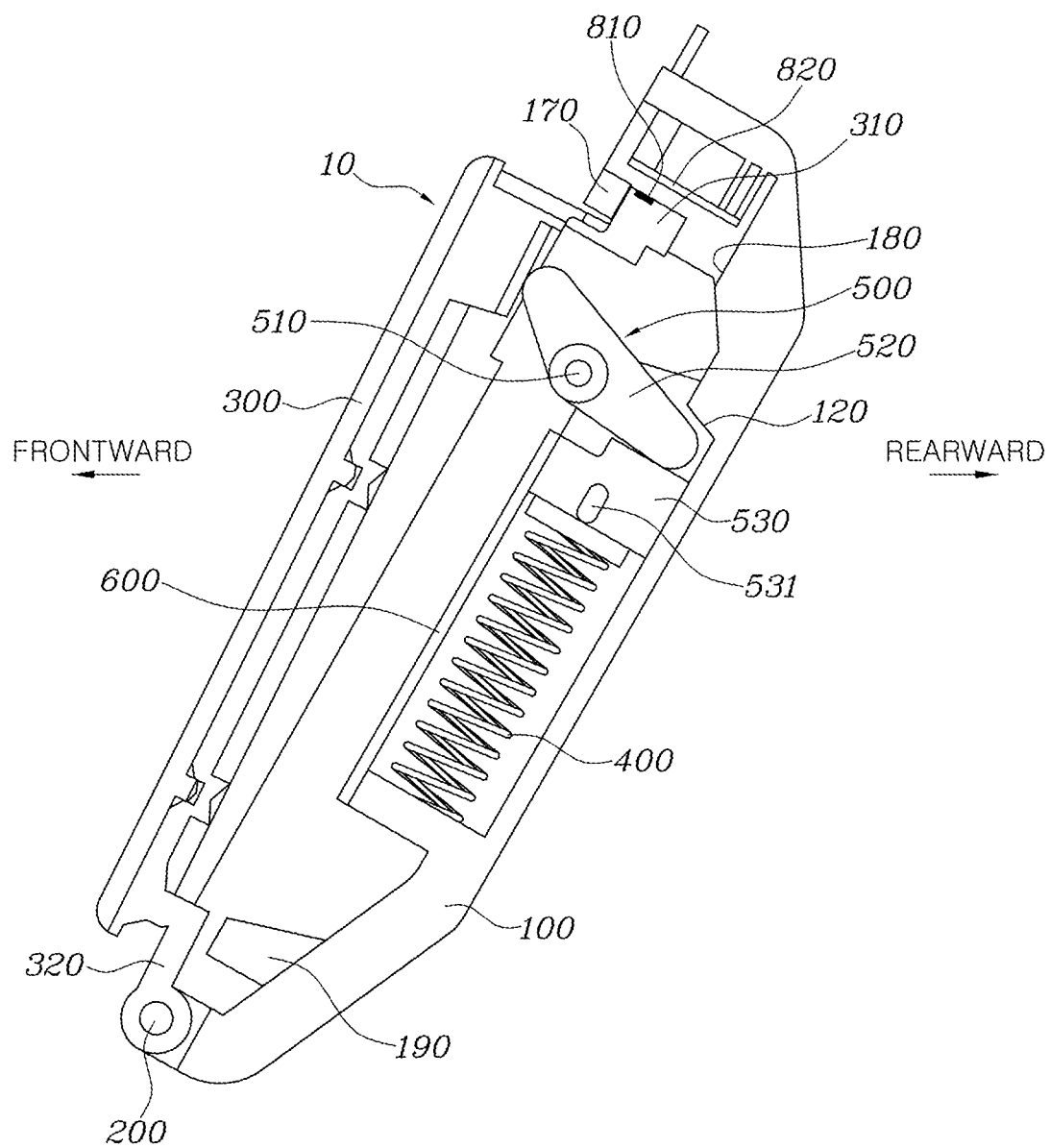
FIG. 4 is a cross-sectional view illustrating the pedal according to the present disclosure.
Figure 5:
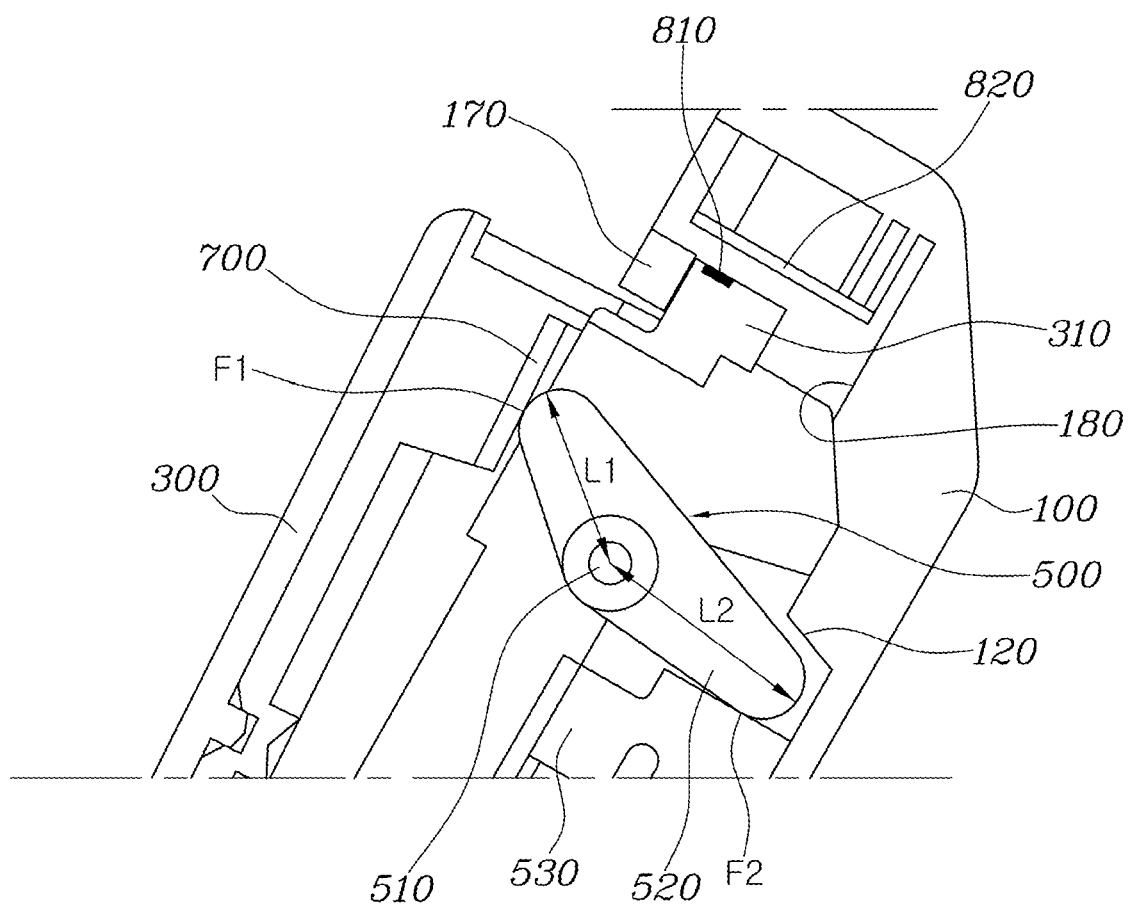
FIG. 5 is an enlarged view illustrating a region where a rotation lever is mounted in FIG. 4.
Figure 6:
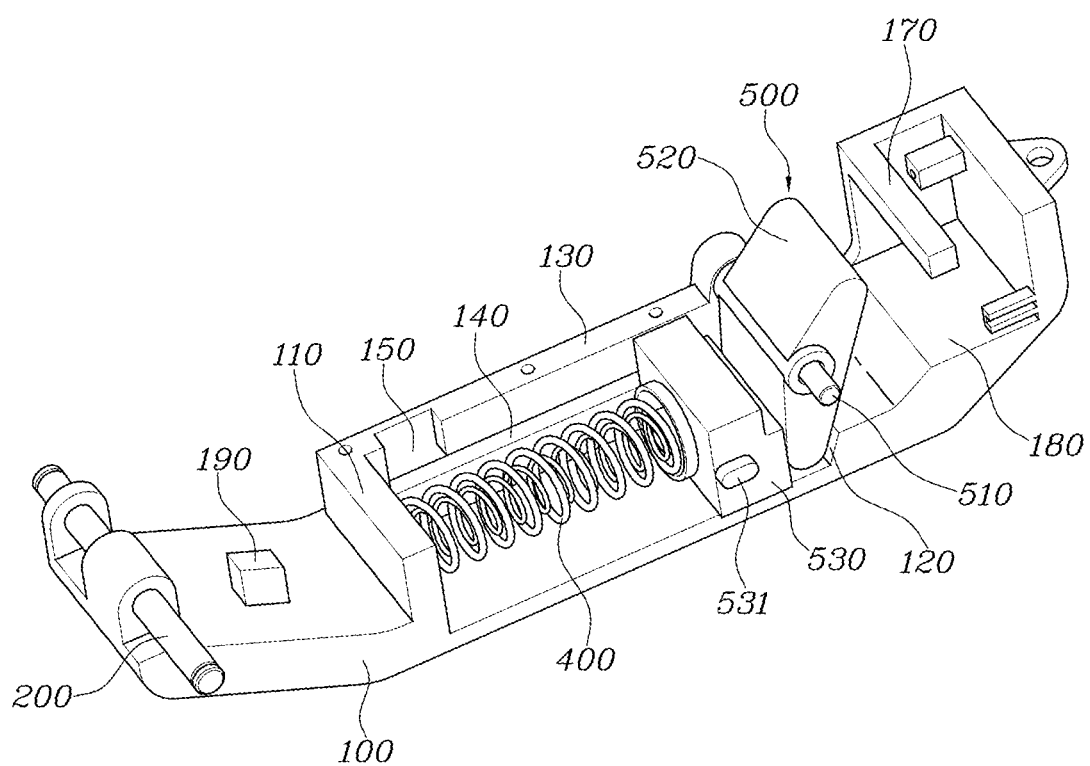
FIGS. 6, 7, 8, 9, and 10 are views illustrating a pedal housing, a return spring, and a connection unit according to the present disclosure.
Figure 7:
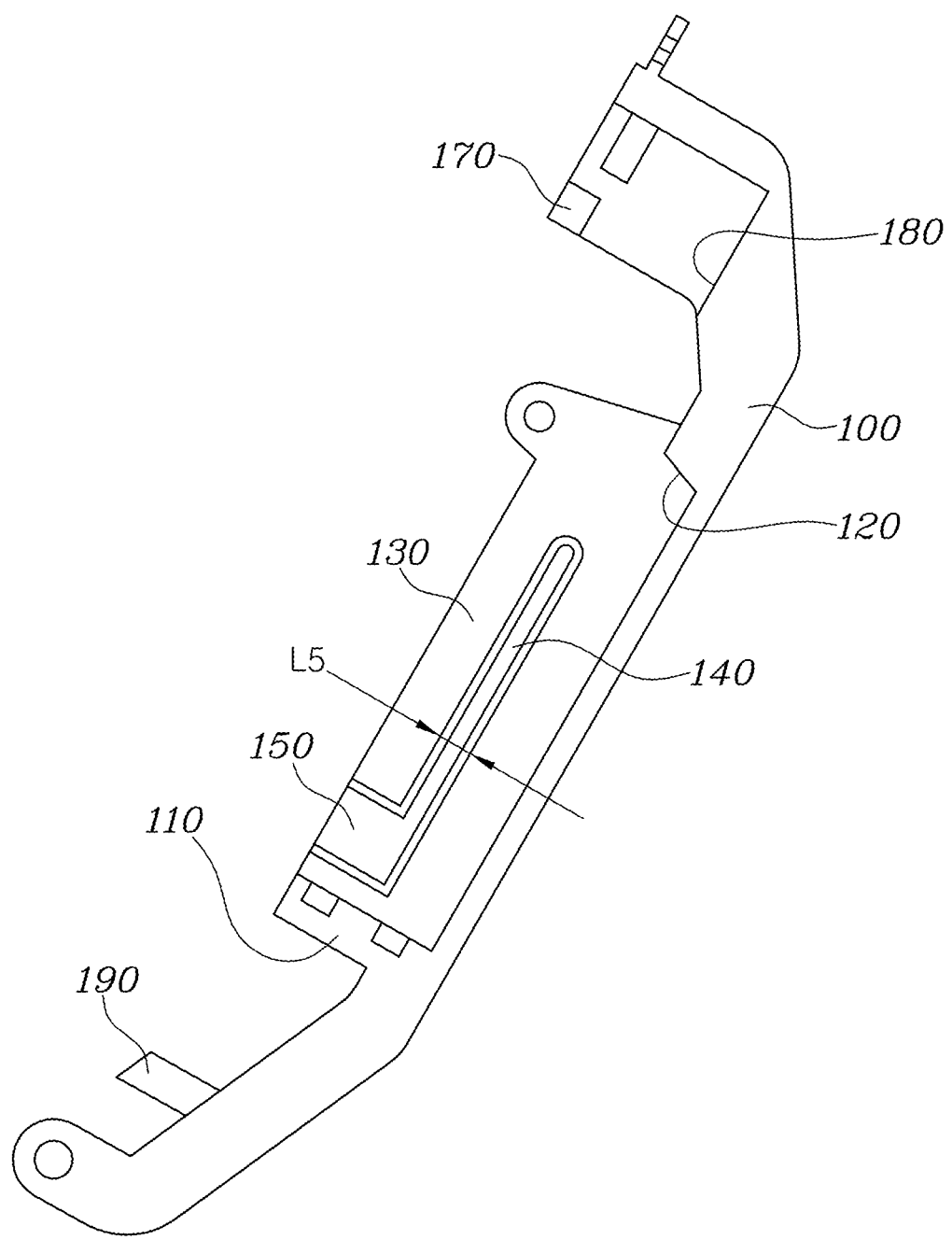
Figure 8:
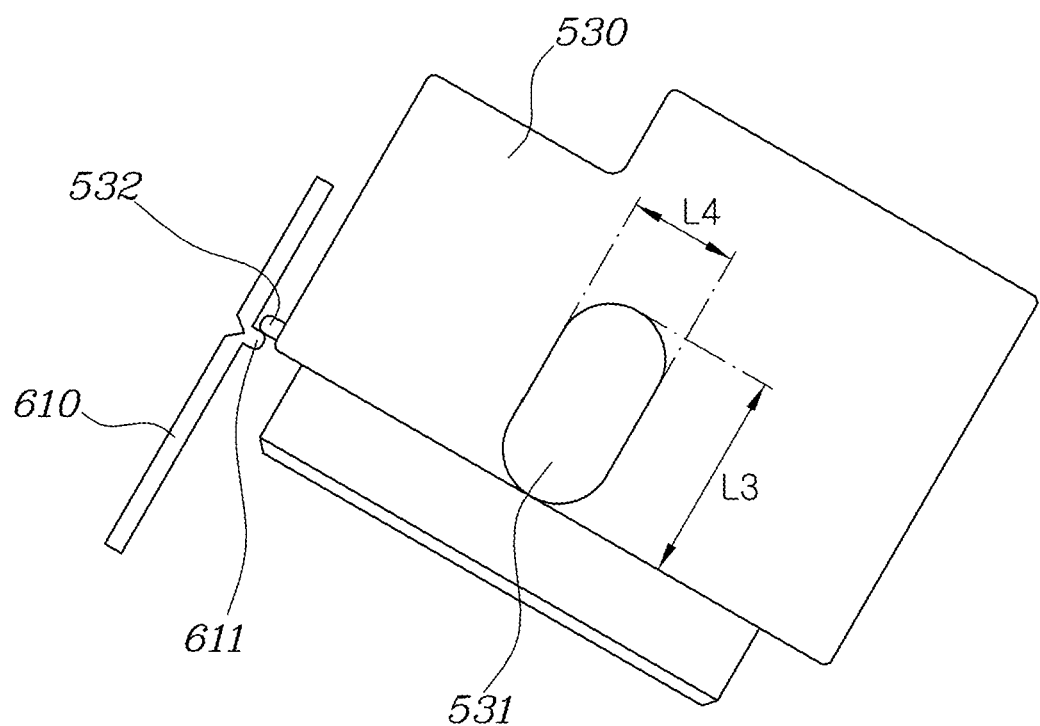
Figure 9:
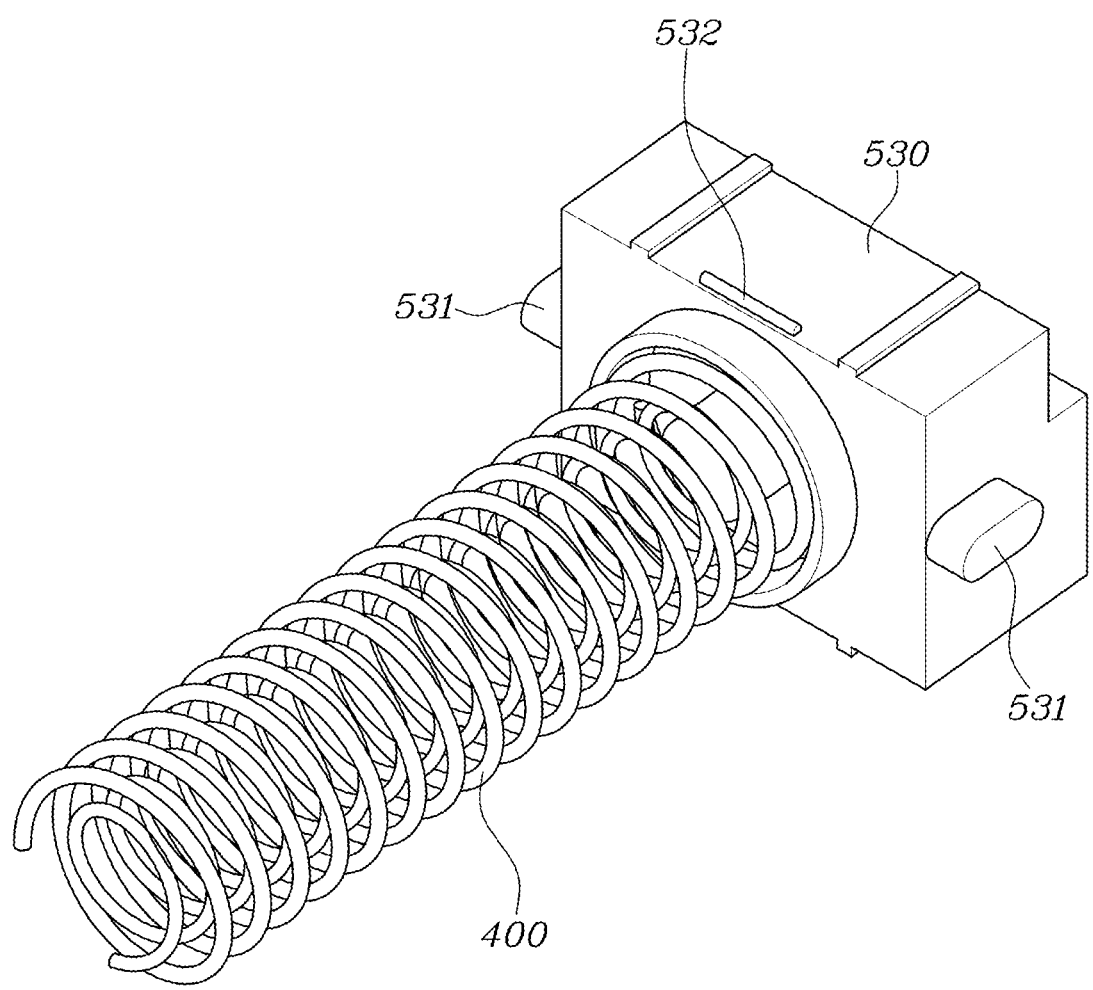
Figure 10:
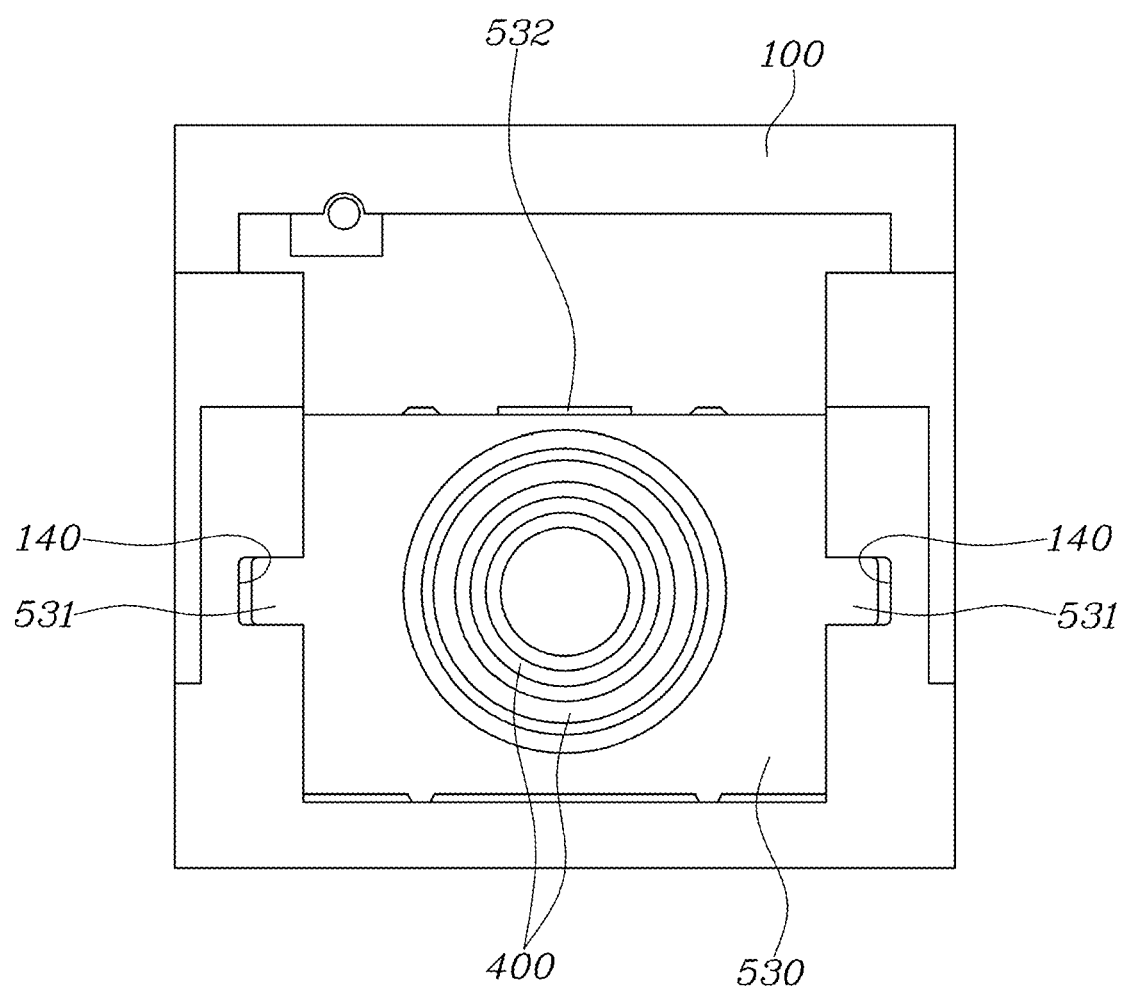
Figure 11:
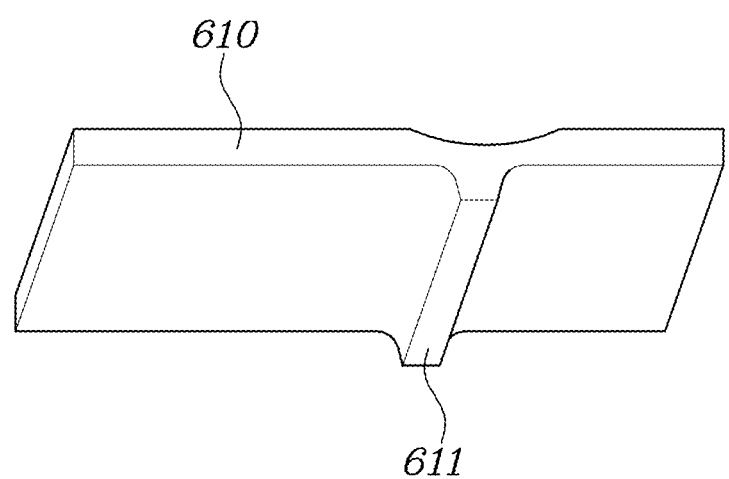
FIG. 11 is a view illustrating a plate spring according to the present disclosure.
Figure 12:
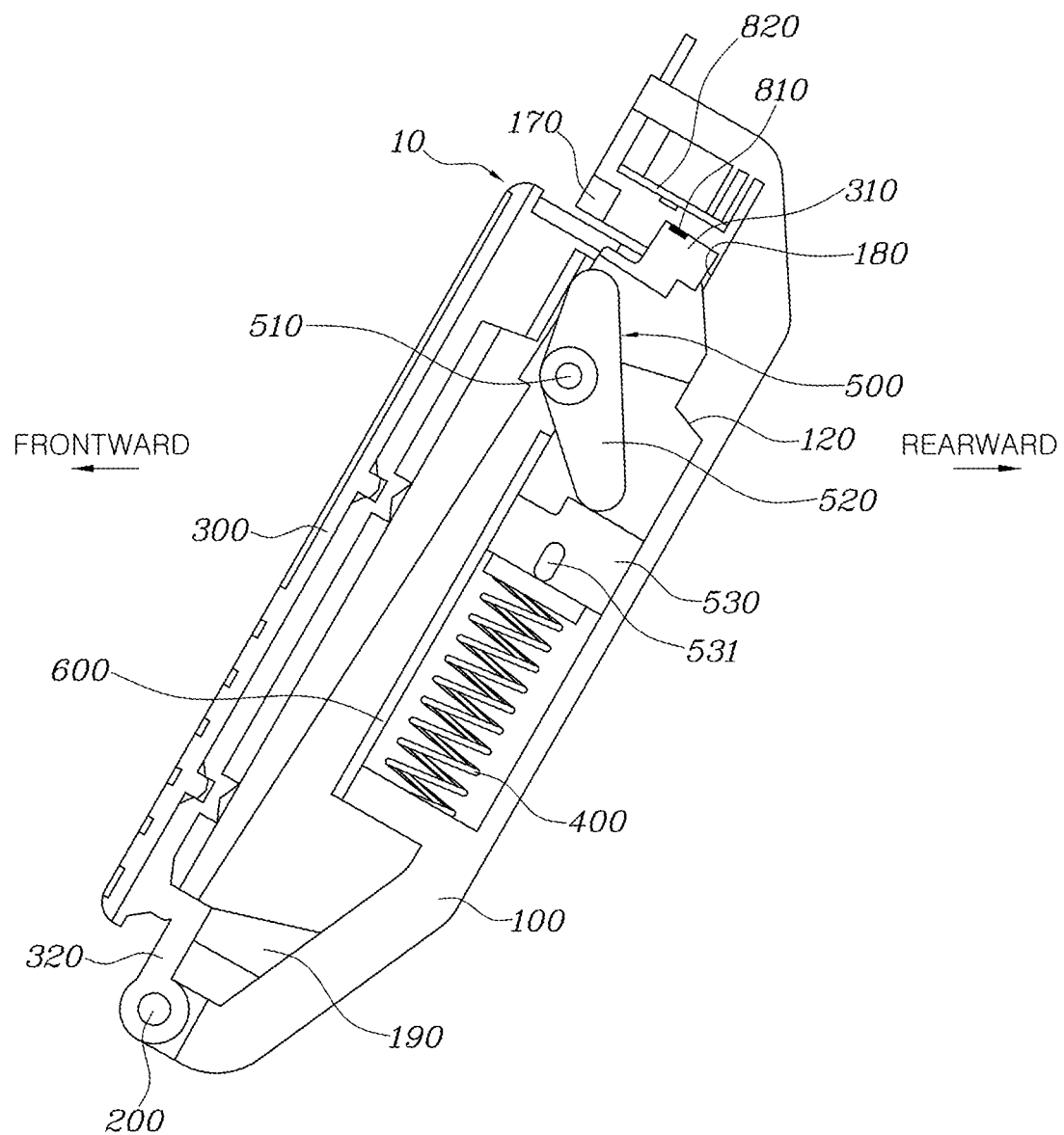
FIG. 12 is a view illustrating a state in which a pedal pad is in a full stroke state.

An electronic pedal apparatus according to the present disclosure is configured as an organ type electronic pedal apparatus, and is configured as a fine displacement pedal that is operated with a fine displacement when a driver operates the fine displacement pedal. As illustrated in FIGS. 1 to 12, the electronic pedal apparatus includes a pedal pad 300 coupled to a pedal housing via a hinge pin such that the pedal pad 300 is capable of being rotated, the pedal pad 300 being configured to be operated by a driver, a return spring 400 displaced such that the return spring 400 extends from the pedal housing 100 along a longitudinal direction of the pedal pad 300, the return spring 400 being configured to provide a return force to the pedal pad 300, and a connection unit 500 mounted such that the connection unit 500 connects the pedal pad 300 and the return spring 400 to each other, the connection unit 500 being configured to convert a rotational movement of the pedal pad 300 into a linear movement and to compress the return spring 400.

A pedal 10 according to an embodiment of the present disclosure includes an accelerator pedal 11 and a brake pedal 12 that are spaced apart from each other in left and right directions in a case 20.

In order to prevent misoperation of the driver, the pedal pad 300 of the accelerator pedal 11 may be mounted in a vertical direction and the pedal pad 300 of the brake pedal 12 may be mounted in a horizontal direction, but are not limited thereto.

The accelerator pedal 11 and the brake pedal 12 may have the same configuration and the same operation of parts, thereby allowing the parts to be used in common.

In addition, when describing the configuration of the accelerator pedal 11 and the configuration of the brake pedal 12, the configuration of the accelerator pedal 11 and the configuration of the brake pedal 12 will not be described individually, but will be described below as a unified configuration of the pedal 10.

The case 20 is mounted on and fixed to a space under a driver's seat, and is formed in a box shape having a hollow interior.

The case 20 is provided with a case cover 21, and an upper portion of the case 20 is covered by the case cover 21.

The pedal pad 300 of the pedal 10 protrudes upward of the case cover 21 so that the driver can operate the pedal 10.

The pedal 10 according to the present disclosure may include the pedal housing 100, the pedal pad 300 configured to be operated by the driver, the return spring 400 configured to provide a return force to the pedal pad 300, and the connection unit 500 connecting the pedal pad 300 and the return spring 400 to each other.

The pedal pad 300 may be configured as an organ type pedal pad which has a lower end coupled to the pedal housing 100 via the hinge pin 200 such that the pedal pad 300 is capable of being rotated and which has an upper end capable of being rotated forward and backward around the hinge pin 200.

The return spring 400 may be disposed below the pedal pad 300 in the pedal housing 100, and may be mounted such that the return spring 400 obliquely extends along front and rear directions that are a longitudinal direction of the pedal pad 300.

Since the return spring 400 is displaced such that the return spring 400 extends along the longitudinal direction of the pedal pad 300, the overall height of the pedal apparatus may have a small size while a length of the return spring 400 may have a long size, so that there is an advantage that a large indoor space may be secured.

The return spring 400 may include a plurality of return springs having different spring forces for realizing a fail-safe and an efficient pedal force.

When the pedal pad 300 is rotated forward and inserted into the case 20 by an operation of the driver, an operation force of the pedal pad 300 is transferred to the return spring 400 through the connection unit 500, and the return spring 400 is compressed. When the operation force of the driver is released from the pedal pad 300 while the pedal pad 300 is in a rotated state, the shape of the return spring 400 is restored, and the return spring 400 rotates the pedal pad 300 in the opposite direction by the spring force, so that the pedal pad 300 is returned to the initial position.

The connection unit 500 according to the present disclosure includes a rotation lever 520 mounted on the pedal housing 100 such that the rotation lever 520 is capable of being rotated around a lever pin 510, the rotation lever 520 having an upper end thereof in contact with the pedal pad 300, and a spring guide 530 having a front side surface in contact with a lower end of the rotation lever 520 and having a rear side surface in contact with the return spring 400, the spring guide 530 being configured to linearly move with respect to the pedal housing by an elastic force of the return spring 400.

The rotation lever 520 is mounted such that a middle portion between the upper end and the lower end thereof is capable of being rotated on the pedal housing 100 around the lever pin 510.

The rotation lever 520 is positioned on a lower portion of a front side of the pedal pad 300, so that the upper end of the rotation lever 520 is in contact with the pedal pad 300. Furthermore, the spring guide 530 is positioned on a lower end of a rear side of the rotation lever 520, so that the lower end of the rotation lever 520 and the front side surface of the spring guide 530 are in contact with each other.

A front side end of the return spring 400 is in contact with the rear side surface of the spring guide 530, and a rear side end of the return spring 400 that extends in a straight line is in contact with and is supported by a rear side wall 110 of the pedal housing 100.

When the pedal pad 300 is rotated around the hinge pin 200 such that the pedal pad 300 is inserted into the pedal housing 100 by the operation of the driver, the rotation lever 520 is rotated around the lever pin 510, and the lower end of the rotation lever 520 pushes the spring guide 530 rearward. At this time, the return spring 400 is compressed and a pedal operation force is generated.

When the operation force of the driver is removed from the pedal pad 300, the compressed return spring 400 is restored, and the spring guide 530 that was moved rearward is pushed forward again. Furthermore, the rotation lever 520 is rotated in the opposite direction by the forward movement of the spring guide 530, and the pedal pad 300 is returned to the initial position.

It is preferable that a second length L2 from a center of the lever pin 510 to a lower distal end of the rotation lever 520 in contact with the spring guide 530 is formed longer than a first length L1 from the center of the lever pin 510 to an upper distal end of the rotation lever 520 in contact with the pedal pad 300.

In order to compress the return spring 400 significantly compared to the rotation amount of the pedal pad 300, the rotation lever 520 must satisfy a condition that the second length L2 is formed longer than the first length L1, so that a large change in the pedal force may be realized, thereby allowing the driver to easily recognize an operation situation of the pedal.

According to the present disclosure, the pedal apparatus may further include a lever stopper portion 120 provided at a bottom of the pedal housing 100.

The lever stopper portion 120 is formed integrally on the bottom of the pedal housing 100, and is in contact with a front side surface of a lower end of the rotation lever 510, thereby restraining the initial position and the return position of the rotation lever 520.

The lever stopper portion 120 having a locking step structure that protrudes upward from the bottom of the pedal housing 100 is provided at the front side of the lower end of the rotation lever 520. Furthermore, as the front side surface of the lower end of the rotation lever 520 is in contact with the lever stopper portion 120, the initial position of the rotation lever 520 and the return position by the return spring 400 may be restrained.

According to the present disclosure, a guide protrusion 531 protrudes on a side surface of the spring guide 530, and a guide groove 140 into which the guide protrusion 531 is inserted and which extends along a movement direction of the spring guide 530 is formed on a side wall 130 of the pedal housing 100.

Respective guide protrusions 531 protrude on left and right side surfaces of the spring guide 530, and respective guide grooves 140 into which the guide protrusions 531 are respectively inserted and along which the guide protrusions 531 are rectilinearly moved are formed in left and right side walls 130 of the pedal housing 100 facing the guide protrusions 531.

The guide protrusion 531 and the guide groove 140 serve to guide forward and rearward rectilinear movements of the spring guide 530 by a rotation force of the rotation lever 520 or a restoring force of the return spring 400.

The rear wall 110 and the left and right side walls 130 of the pedal housing 100 are connected to each other, and a mounting space and a moving space for the return spring 400 and for the spring guide 530 may be secured by the rear wall 110 and the left and right side walls 130.

According to the present disclosure, the guide protrusion 531 of the spring guide 530 and the guide groove 140 of the pedal housing 100 are formed in shapes corresponding to each other. More specifically, it is preferable that a third length L3 of the guide protrusion 531 in front and rear directions corresponding to the movement direction of the spring guide 530 is formed longer than a fourth length LA of the guide protrusion 531 in up and down directions.

The guide protrusion 531 formed on each of the left and right sides of the spring guide 530 is a protrusion having the third length L3 in the oblique front and rear directions corresponding to the movement direction of the spring guide 530 is relatively longer than the fourth length L4 in the up and down directions that are perpendicular to the direction of the third length L3.

In addition, in the guide groove 140 formed in the pedal housing 100, the guide groove 140 has a fifth length L5 corresponding to the up and down directions slightly larger than or almost the same size as the fourth length L4 of the guide protrusion 531, so that the guide protrusion 531 is capable of being rectilinearly moved along the guide groove 140. In addition, when the guide protrusion 531 is rectilinearly moved along the guide groove 140, the guide groove 140 may serve to maximally prevent the spring guide 530 to be swayed in the up and down directions and also prevent the spring guide 530 from being rotated.

The pedal housing 100 may have an insertion groove 150 connected to a rear side end of the guide groove 140 and opened upward from the pedal housing 100, and the guide protrusion 531 of the spring guide 530 may be mounted such that the guide protrusion 531 is inserted into the guide groove 140 of the pedal housing 100 through the insertion groove 150.

The pedal apparatus according to the present disclosure may further include a housing cover 600 coupled to the pedal housing 100 such that the housing cover 600 covers the return spring 400 and the spring guide 530, thereby preventing the return spring 400 and the housing cover 600 from being separated upward.

The housing cover 600 is formed in a rectangular plate shape, and the housing cover 600 is mounted such that a bottom surface of the housing cover 600 is in contact with and fixed to the rear wall 110 and the left and right side walls 130 of the pedal housing 100.

When the housing cover 600 is coupled to and mounted on the pedal housing 100, a mounting space of the return spring 400 and the spring guide 530 in the pedal housing 100 is covered by the housing cover 600 that covers an upper side of the pedal housing 100.

The guide protrusion 531 of the spring guide 530 is inserted into the insertion groove 150 of the pedal housing 100, then the guide protrusion 531 is inserted into the guide groove 140 of the pedal housing by pushing the spring guide 530 downward, and then the housing cover 600 is coupled to and fixed to the pedal housing 100.

When the housing cover 600 is coupled to the pedal housing 100, an upper side of the insertion groove 150 is blocked by the housing cover 600 and the housing cover 600 covers the return spring 400 and the spring guide 530 from each upper side of the return spring 400 and the spring guide 530, so that the housing cover 600 is capable of preventing the return spring 400 and the spring guide 530 from being separated upward when the pedal pad 300 is operated.

According to the present disclosure, a first protrusion 532 that protrudes toward the housing cover 600 is formed in the spring guide 530, and a plate spring 610 provided with a second protrusion 611 that realizes an operation sensation by being in contact with the first protrusion 532 is coupled to the housing cover 600.

On an upper surface of the spring guide 530, the first protrusion 532 that is a fine protrusion protrudes toward the housing cover 600.

The plate spring 610 for realizing the operation sensation of the accelerator pedal 11 is coupled to the housing cover 600, and the plate spring 610 is provided with the second protrusion 611 that is the fine protrusion in contact with the first protrusion 532.

As a middle portion of the plate spring 610 is bent downward toward the spring guide 530, the second protrusion 611 may be formed such that the second protrusion 611 protrudes downward on the middle portion of the plate spring 610.

When the spring guide 530 is moved rearward by the rotation of the rotation lever 520 at the beginning of the pedal operation, the first protrusion 532 of the spring guide 530 meets the second protrusion 611 of the plate spring 610 so that a substantial operation sensation is realized, so that the driver may recognize the operation sensation of the pedal.

The first protrusion of the spring guide 530 and the plate spring 610 that is provided with the second protrusion 611 is applied only to the accelerator pedal 11, and is not applied to the brake pedal 12, so that a pedal misoperation of the driver may be prevented.

In the pedal apparatus according to the present disclosure, a friction plate 700 is coupled to a bottom surface of the pedal pad 300, and the upper end of the rotation lever 520 is in contact with the friction plate 700, thereby realizing a first friction portion F1. Therefore, by the first friction portion F1, hysteresis may be realized when the pedal pad 300 is operated.

In addition, in the pedal apparatus, the lower end of the rotation lever 520 is in contact with the spring guide 530, thereby realizing a second friction portion F2. Therefore, when the pedal pad 300 is operated, the hysteresis may be realized by a simultaneous action of the first friction portion F1 and the second friction portion F2.

In the pedal apparatus according to the present disclosure, when the pedal pad 300 is operated, friction occurs at the first and second friction portions F1 and F2 at the same time, so that a large hysteresis is capable of being realized with a large friction force.

The technology of the present disclosure may be applied to a fine displacement pedal in which a pedal stroke is small. Therefore, when the pedal pad is operated, a change in the pedal force may be maximized during an initial stage stroke and a middle stage stroke.

That is, in the initial and middle stage strokes of the pedal pad 300 that is mainly used by the driver, a large change in the pedal force of the pedal is realized by the contact between the first and second protrusions 532 and 611 of the spring guide 530 and the plate spring 610 and the action of the first and second friction portions F1 and F2, thereby increasing the cognition. Furthermore, in a final stage stroke of the pedal pad 300, the stroke is relatively short, so that the large change in the pedal force of the pedal does not occur.

When a sudden acceleration or a sudden braking is performed, the accelerator pedal or the brake pedal is mostly pressed to the maximum level, so that the large change in the pedal force at the final stage stroke is not meaningful.

However, in a city driving in which a low speed and a medium speed are required, a precise pedal stroke of the driver is required. At this time, it is preferable to increase the cognition by increasing the change in the pedal force.

The pedal apparatus according to the present disclosure further includes a first permanent magnet 810 coupled to the pedal pad 300, and includes a first PCB (Printed Circuit Board) 820 coupled to the pedal housing 100 such that the first PCB 820 faces the first permanent magnet 810. When the pedal pad 300 is rotated, the first PCB 820 may recognize a change in a magnetic flux of the first permanent magnet 810 and may generate a signal related to a pedal function. Furthermore, the signal related to the pedal function may be a signal related to braking or may be a signal related to acceleration.

In addition, the pedal apparatus according to the present disclosure further includes a second permanent magnet 830 coupled to the pedal pad 300, and includes a second PCB 840 coupled to the pedal housing 100 such that the second PCB 840 faces the second permanent magnet 830. When the pedal pad 300 is rotated, the second PCB 840 may recognize a change in a magnetic flux of the second permanent magnet 830 and may generate a signal related to the pedal function. Furthermore, the signal related to the pedal function may be the signal related to braking or may be the signal related to acceleration.

Since the second PCB 840 is coupled to a sensor cover 160 and the sensor cover 160 is coupled to the pedal housing 100 such that the sensor cover 160 is integrated with the pedal housing 100, the pedal housing 100 may be considered as a configuration including the sensor cover 160. Therefore, as in the present disclosure, the second PCB 840 may have a structure in which the second PCB 840 is coupled to the pedal housing 100.

The first and second PCBs 820 and 840 are provided with respective Hall sensors. Furthermore, when the pedal pad 300 is operated, the first and second PCBs 820 and 840 may detect the change in the magnetic flux and may transmit each pedal operation signal to a vehicle controller.

According to the present disclosure, the first permanent magnet 810 is coupled to the pedal pad 300 at a position furthest from the hinge pin 200, and the second permanent magnet 830 is coupled to a position relatively closer to the hinge pin 200 than the first permanent magnet 810.

Therefore, when the pedal pad 300 is operated, the first permanent magnet 810 has a movement displacement relatively larger than a movement displacement of the second permanent magnet 830, so that the first permanent magnet 810 may be utilized as a main sensor. Furthermore, the second permanent magnet 830 has the movement displacement relatively smaller than the movement displacement of the first permanent magnet 810, so that the second permanent magnet 830 may be utilized as a redundancy sensor.

In more detail, the first permanent magnet 810 may be positioned on and coupled to the front side end of the pedal pad 300 furthest from the hinge pin 200, and the second permanent magnet 830 may be positioned on and coupled to a first side surface relatively closer to the hinge pin 200 than the first permanent magnet 810 without being affected by the first permanent magnet 810.

In the pedal apparatus according to the present disclosure, when the pedal pad 300 is rotated by the operation of the driver, the first PCB 820 and the second PCB 840 respectively transmit signals so that redundancy may be secured.

The first permanent magnet 810 is positioned at the front side end of the pedal pad 300 furthest from the hinge pin 200, so that the first permanent magnet 810 has a large movement displacement when the pedal pad 300 is operated. Therefore, the first PCB 820 is capable of detecting a more accurate pedal operation amount so that the first PCB 820 may be utilized as a main sensor.

The second permanent magnet 830 is positioned at the position relatively closer to the hinge pin 200 than the first permanent magnet 810, and is positioned at the side surface of the pedal pad 300 such that the second permanent magnet 830 is not affected by the magnetic flux of the first permanent magnet 810. Therefore, when the pedal pad 300 is operated, the second permanent magnet 830 has a movement displacement relatively smaller than the movement displacement of the first permanent magnet 810, so that the second PCB 840 may be utilized as a redundancy sensor when failure of the first PCB 820 occurs.

As such, the pedal apparatus according to the present disclosure is capable of performing more stable and accurate sensing through the dualized sensors.

According to the present disclosure, a pad protrusion portion 310 is provided on the front side of the pedal pad 300, a first stopper portion 170 is provided on the front side of the pedal housing 100 where the first stopper portion 170 faces the pad protrusion portion 310. Furthermore, when the pad protrusion portion 310 and the first stopper portion 170 are in contact with each other, the initial position of the pedal pad 300 and the return position of the pedal pad 300 due to the spring force of the return spring 400 may be regulated.

In the pedal apparatus according to the present disclosure, the pad protrusion portion 310 protrudes forward on the front side end of the pedal pad 300, and the first stopper portion 170 is provided on the pedal pad housing 100 at the position facing the pedal protrusion portion 310.

The first stopper portion 170 is positioned above the pedal protrusion portion 310 along a rotation radius of the pedal pad 300 centered on the hinge pin 200.

Therefore, when the driver operates the pedal pad 300, the pedal pad 300 is rotated around the hinge pin 200 such that the upper end of the pedal pad 300 is rotated downward. At this time, the return spring 400 is compressed by the rotation of the rotation lever 510 and a rearward movement of the spring guide 530. Furthermore, when the operation force of the driver is removed from the pedal pad 300, the pedal pad 300 is rotated in the opposite direction and returns to the initial position by the restoring force of the return spring 400. Therefore, the initial position and the return position of the pedal pad 300 may be regulated by the contact between the pedal protrusion portion 310 and the first stopper portion 170 (see FIG. 4 and FIG. 5).

The first permanent magnet 810 may be coupled to a front surface of the pedal protrusion portion 170.

In addition, in the pedal apparatus according to the present disclosure, a second stopper portion 180 is provided below the first stopper portion 170 in the front side of the pedal housing 100. Furthermore, as the pedal pad 300 is rotated such that the pedal pad 300 is inserted into the pedal housing 100 and the pad protrusion portion 310 is in contact with the second stopper portion 180, a full stroke position of the pedal pad 300 may be regulated.

The second stopper portion 180 may be provided on the front side of the pedal housing 100 facing the pad protrusion portion 310 such that the first stopper portion 170 and the second stopper portion 180 are spaced vertically apart from each other in the up and down directions.

The first stopper portion 170 and the second stopper portion 180 are spaced vertically apart from each other on the rotation radius of the pedal pad 300 centered on the hinge pin 200, and the pad protrusion portion 310 is positioned between the first stopper portion 170 and the second stopper portion 180.

Therefore, in the pedal apparatus according to the present disclosure, as the pedal pad 300 is rotated by the operation of the driver such that the pedal pad 300 is inserted into the pedal housing 100 and the pad protrusion portion 310 is in contact with the second stopper portion 180, the full stroke position of the pedal pad 300 may be regulated.

When the driver operates the pedal pad 300, the pedal pad 300 is rotated such that the upper end of the pedal pad 300 is rotated downward and is inserted into the pedal housing 100. At this time, the pad protrusion 310 provided on the pedal pad 300 is in contact with the second stopper portion 180 provided on the pedal housing 100, and the full stroke position of the pedal pad 300 may be regulated.

In addition, in the pedal apparatus according to the present disclosure, the hinge pin 200 is coupled to a lower connection portion 320 of the pedal pad 300, the pedal housing 100 is provided with a third stopper portion 190 that protrudes toward the lower connection portion 320. Therefore, when the pedal pad 300 is rotated such that the pedal pad 300 is inserted into the pedal housing 100 and the lower connection portion 320 is in contact with the third stopper portion 190, the full stroke position of the pedal pad 300 may be regulated.

In more detail, in the pedal apparatus according to the present disclosure, when the pedal pad 300 is rotated such that the pedal pad 300 is inserted into the pedal housing 100 by the operation of the driver, the full stroke position of the pedal pad 300 may be regulated by simultaneous contact between the pad protrusion portion 310 and the second stopper portion 180 and between the lower connection portion 320 and the third stopper portion 190.

Since the driver is capable of applying a large load during the full stroke of the pedal pad 300, the third stopper portion 190 may be additionally provided on the pedal housing 100. At this time, by the simultaneous contact between the pad protrusion portion 310 and the second stopper portion 180 and between the lower connection portion 320 and the third stopper portion 190, the full stroke position of the pedal pad 300 may be regulated and a support force for the operation of the pedal pad 300 may be sufficiently secured.

As described above, in the electronic pedal apparatus according to the present disclosure, the driver is capable of operating the pedal with a small force. Furthermore, when the driver operates the pedal pad 300, the pedal pad 300 is operated with a fine displacement, but the change in the pedal force is increased through compression of the return spring 400 using the rotation lever 520 and the spring guide 530, so that the driver is capable of easily recognizing an operation situation of the pedal and there is an advantage that fatigue of the driver may be reduced.

In addition, the pedal apparatus according to the present disclosure has a configuration in which the pedal operation is detected by a dual sensing structure using the first and second permanent magnets 810 and 830 and the first and second PCBs 820 and 840, so that there is an advantage that safety during the pedal operation may be further enhanced.

In addition, in the pedal apparatus according to the present disclosure, the return spring 400 that provides the return force to the pedal pad 300 is disposed such that the return spring 400 extends along the front and rear directions corresponding to the longitudinal direction of the pedal pad 300. Therefore, the overall height of the pedal apparatus may be configured to be small while the return spring 400 has a long length, so that there is an advantage that a large indoor space may be secured.

In addition, in the pedal apparatus according to the present disclosure, when the driver operates the pedal pad 300, a hysteresis operation force may be significantly realized by a simultaneous action of the first friction portion F1 and the second friction portion F2, so that there is an advantage that the fatigue of the driver's ankle may be reduced.

In addition, in the pedal apparatus according to the present disclosure, during the initial operation stage of the pedal pad 300 by the driver, the first protrusion 532 of the spring guide 530 meets the second protrusion 611 of the plate spring 610, so that the substantial operation sensation is capable of being realized, thereby allowing the driver to recognize the operation sensation of the pedal. Particularly, the first protrusion 532 of the spring guide 530 and the plate spring 610 that is provided with the second protrusion 611 are applied only to the accelerator pedal 11, so that there is an advantage that a misoperation of the brake pedal 12 may be prevented.

Although exemplary embodiments of the present disclosure have been described herein, it is understood that the present disclosure should not be limited to these exemplary embodiments and that various changes and modifications can be made by one ordinary skilled in the art within the spirit and scope of the present disclosure.

The invention claimed is:

1. An electronic pedal apparatus comprising:
    a pedal pad coupled to a pedal housing via a hinge pin such that the pedal pad is capable of being rotated, the pedal pad being configured to be operated by a driver;
    a return spring disposed on the pedal housing such that the return spring extends along a longitudinal direction of the pedal pad, the return spring being configured to provide a return force to the pedal pad;
    a connection unit connecting the pedal pad to the return spring, the connection unit being configured to be operated such that a rotational movement of the pedal pad is converted into a rectilinear movement, and the return spring is compressed;
    a first permanent magnet coupled to the pedal pad; and
    a first printed circuit board (PCB) coupled to the pedal housing facing the first permanent magnet;
    wherein the first PCB is configured to recognize a change in magnetic flux of the first permanent magnet, and to generate a signal related to a pedal function when the pedal pad is rotated.

2. The electronic pedal apparatus of claim 1, wherein the connection unit comprises:
    a rotation lever mounted on the pedal housing, the rotation lever capable of being rotated around a lever pin, the rotation lever having an upper end in contact with the pedal pad; and
    a spring guide having a front side surface in contact with a lower end of the rotation lever, and having a rear side surface in contact with the return spring, the spring guide being configured to be rectilinearly moved with respect to the pedal housing by a rotation force of the rotation lever and an elastic force of the return spring.

3. The electronic pedal apparatus of claim 1, further comprising:
    a second permanent magnet coupled to the pedal pad; and
    a second PCB coupled to the pedal housing facing the second permanent magnet;
    wherein the second PCB is configured to recognize a change in magnetic flux of the second permanent magnet and to generate a signal related to the pedal function when the pedal pad is rotated.

4. The electronic pedal apparatus of claim 3, wherein the first permanent magnet is coupled to the pedal pad at a position furthest from the hinge pin, and the second permanent magnet is coupled to the pedal pad at a position closer to the hinge pin than the first permanent magnet; and
    when the pedal pad is operated, the first permanent magnet is utilized as a main sensor since the first permanent magnet has a movement displacement larger than a movement displacement of the second permanent magnet, and the second permanent magnet is utilized as a redundancy sensor since the second permanent magnet has the movement displacement smaller than the movement displacement of the first permanent magnet.

5. The electronic pedal apparatus of claim 3, wherein the first permanent magnet is coupled to a front side end of the pedal pad furthest from the hinge pin, and the second permanent magnet is coupled to a side surface of the pedal pad closer to the hinge pin than the first permanent magnet without being affected by the first permanent magnet.

6. The electronic pedal apparatus of claim 1, wherein a pad protrusion portion is provided on a front side of the pedal pad, a first stopper portion is provided on a front side of the pedal housing at a portion facing the pad protrusion portion, and an initial position of the pedal pad and a return position of the pedal pad by a spring force of the return spring are regulated when the pad protrusion portion and the first stopper portion are in contact with each other.

7. The electronic pedal apparatus of claim 6, wherein a second stopper portion is provided on the front side of the pedal housing below the first stopper portion, and a full stroke position of the pedal pad is regulated when the pad protrusion portion is in contact with the second stopper portion while the pedal pad is rotated such that the pedal pad is inserted into the pedal housing.

8. The electronic pedal apparatus of claim 7, wherein the hinge pin is coupled to a lower connection portion of the pedal pad, a third stopper portion that protrudes toward the lower connection portion is provided on the pedal housing, and the full stroke position of the pedal pad is regulated when the lower connection portion is in contact with the third stopper portion while the pedal pad is rotated such that the pedal pad is inserted into the pedal housing.

9. The electronic pedal apparatus of claim 8, wherein the full stroke position of the pedal pad is regulated by a simultaneous contact between the pad protrusion portion and the second stopper portion, and between the lower connection portion and the third stopper portion.

10. An electronic pedal apparatus comprising:
a pedal pad coupled to a pedal housing via a hinge pin such that the pedal pad is capable of being rotated, the pedal pad being configured to be operated by a driver;
a return spring disposed on the pedal housing such that the return spring extends along a longitudinal direction of the pedal pad, the return spring being configured to provide a return force to the pedal pad; and
a connection unit connecting the pedal pad to the return spring, the connection unit being configured to be operated such that a rotational movement of the pedal pad is converted into a rectilinear movement, and the return spring is compressed;
wherein the connection unit comprises:
a rotation lever mounted on the pedal housing, the rotation lever capable of being rotated around a lever pin, the rotation lever having an upper end in contact with the pedal pad; and
a spring guide having a front side surface in contact with a lower end of the rotation lever, and having a rear side surface in contact with the return spring, the spring guide being configured to be rectilinearly moved with respect to the pedal housing by a rotation force of the rotation lever and an elastic force of the return spring;
wherein a second length of the rotation lever from a center of the lever pin to the lower end of the rotation lever in contact with the spring guide is longer than a first length of the rotation lever from the center of the lever pin to the upper end of the rotation lever in contact with the pedal pad.

11. The electronic pedal apparatus of claim 10, wherein a bottom of the pedal housing includes lever stopper portion configured to restrain an initial position and a return position of the rotation lever by being in contact with a front side surface of the lower end of the rotation lever.

12. The electronic pedal apparatus of claim 10, wherein a guide protrusion protrudes from a side surface of the spring guide, and a guide groove into which the guide protrusion is inserted extends along a movement direction of the spring guide on a side wall of the pedal housing.

13. The electronic pedal apparatus of claim 12, wherein the guide protrusion and the guide groove are formed in corresponding shapes, and the guide protrusion is formed such that a third length of the guide protrusion in front and rear directions corresponding to the movement direction of the spring guide is longer than a fourth length of the guide protrusion in up and down directions.

14. The electronic pedal apparatus of claim 12, wherein an insertion groove connected to a rear side end of the guide groove and opened upward to the pedal housing is formed in the pedal housing, and the guide protrusion of the spring guide is inserted into the guide groove of the pedal housing through the insertion groove.

15. The electronic pedal apparatus of claim 10, further comprising a housing cover coupled to the pedal housing covering the return spring and the spring guide, thereby preventing the return spring and the spring guide from being separated upward.

16. The electronic pedal apparatus of claim 15, wherein a first protrusion that protrudes toward the housing cover is formed on the spring guide, and a plate spring provided with a second protrusion that realizes an operation sensation by being in contact with the first protrusion is coupled to the housing cover.

17. The electronic pedal apparatus of claim 10, wherein a friction plate is coupled to a bottom surface of the pedal pad, the upper end of the rotation lever and the friction plate are in contact with each other such that a first friction portion is formed, and hysteresis is capable of being realized by the first friction portion when the pedal pad is operated.

18. An electronic pedal apparatus comprising:
a pedal pad coupled to a pedal housing via a hinge pin such that the pedal pad is capable of being rotated, the pedal pad being configured to be operated by a driver;
a return spring disposed on the pedal housing such that the return spring extends along a longitudinal direction of the pedal pad, the return spring being configured to provide a return force to the pedal pad; and
a connection unit connecting the pedal pad to the return spring, the connection unit being configured to be operated such that a rotational movement of the pedal pad is converted into a rectilinear movement, and the return spring is compressed;
wherein the connection unit comprises:
a rotation lever mounted on the pedal housing, the rotation lever capable of being rotated around a lever pin, the rotation lever having an upper end in contact with the pedal pad; and
a spring guide having a front side surface in contact with a lower end of the rotation lever, and having a rear side surface in contact with the return spring, the spring guide being configured to be rectilinearly moved with respect to the pedal housing by a rotation force of the rotation lever and an elastic force of the return spring;
wherein a friction plate is coupled to a bottom surface of the pedal pad, the upper end of the rotation lever and the friction plate are in contact with each other such that a first friction portion is formed, and hysteresis is capable of being realized by the first friction portion when the pedal pad is operated; and wherein the lower end of the rotation lever and the spring guide are in contact with each other forming a second friction portion, and the hysteresis is capable of being realized by a simultaneous action of the first friction portion and the second friction portion when the pedal pad is operated.

19. An electronic pedal apparatus comprising:
a pedal pad coupled to a pedal housing via a hinge pin such that the pedal pad is capable of being rotated, the pedal pad being configured to be operated by a driver;
a return spring disposed on the pedal housing such that the return spring extends along a longitudinal direction of the pedal pad, the return spring being configured to provide a return force to the pedal pad; and
a connection unit connecting the pedal pad to the return spring, the connection unit being configured to be operated such that a rotational movement of the pedal pad is converted into a rectilinear movement, and the return spring is compressed;
wherein a pad protrusion portion is provided on a front side of the pedal pad, a first stopper portion is provided on a front side of the pedal housing at a portion facing the pad protrusion portion, and an initial position of the pedal pad and a return position of the pedal pad by a spring force of the return spring are regulated when the pad protrusion portion and the first stopper portion are in contact with each other.

* * * * *